(12) United States Patent
Shiau et al.

(10) Patent No.: US 12,105,379 B2
(45) Date of Patent: Oct. 1, 2024

(54) DISPLAY DEVICE

(71) Applicant: Coretronic Corporation, Hsin-Chu (TW)

(72) Inventors: Tzeng-Ke Shiau, Hsin-Chu (TW); Yu-Feng Lin, Hsin-Chu (TW); Ying-Shun Syu, Hsin-Chu (TW); Che-Jui Hsu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 18/351,451

(22) Filed: Jul. 12, 2023

(65) Prior Publication Data

US 2024/0069387 A1    Feb. 29, 2024

(30) Foreign Application Priority Data

Aug. 24, 2022    (CN) .......................... 202211016102.3

(51) Int. Cl.
| | | |
|---|---|---|
| *G02F 1/1335* | (2006.01) | |
| *F21V 8/00* | (2006.01) | |
| *G02F 1/1333* | (2006.01) | |

(52) U.S. Cl.
CPC ..... *G02F 1/133616* (2021.01); *G02B 6/0036* (2013.01); *G02B 6/0088* (2013.01); *G02F 1/13338* (2013.01); *G02F 2202/28* (2013.01)

(58) Field of Classification Search
CPC .......... G02F 1/133616; G02F 1/13338; G02F 2202/28; G02B 6/0036; G02B 6/0088
See application file for complete search history.

(56) References Cited

U.S. PATENT DOCUMENTS

| | | | | |
|---|---|---|---|---|
| 6,738,051 B2* | 5/2004 | Boyd | ................... | G02B 6/0023 |
| | | | | 349/63 |
| 2004/0109097 A1* | 6/2004 | Mai | ..................... | G02F 1/13338 |
| | | | | 349/12 |
| 2016/0291238 A1 | 10/2016 | Tai et al. | | |
| 2020/0400866 A1 | 12/2020 | Ko et al. | | |
| 2021/0333826 A1* | 10/2021 | Liao | ..................... | G02B 6/0068 |

FOREIGN PATENT DOCUMENTS

| | | |
|---|---|---|
| TW | 202135174 | 9/2021 |
| TW | I747247 | 11/2021 |

* cited by examiner

*Primary Examiner* — Jessica M Merlin
(74) *Attorney, Agent, or Firm* — JCIPRNET

(57) ABSTRACT

A display device includes a touch panel, an optical adhesive layer, and a front light module that includes a light source and a light guide plate (LGP) including multiple microstructures recessed into the LGP from a first surface of the LGP to form voids. The optical adhesive layer is adhered between the touch panel and a first surface of the LGP. A surface of the optical adhesive layer facing the LGP is in contact with the first surface of the LGP in multiple first regions, and a surface of the optical adhesive layer facing the LGP and the plurality of microstructures being overlapped in multiple second regions. A maximum vertical distance between each void and the first surface is a first depth. A vertical distance between the first regions and the second regions is 0 to 0.7 times the first depth.

10 Claims, 4 Drawing Sheets

DISPLAY DEVICE

CROSS-REFERENCE TO RELATED APPLICATION

This application claims the priority benefit of China application serial no. 202211016102.3, filed on Aug. 24, 2022. The entirety of the above-mentioned patent application is hereby incorporated by reference herein and made a part of this specification.

BACKGROUND OF THE INVENTION

1. Field of the Invention

The invention relates to an electronic device; more particularly, the invention relates to a display device.

DESCRIPTION OF RELATED ART

Nowadays, in the market of various consumers' electronic products, a variety of displays have been extensively used as display screens in portable electronic devices, such as electronic paper displays used in e-books, reflective displays, or the like.

In the related art, an electronic paper display or a reflective display may apply ambient light as incident light to irradiate a display layer to achieve display purposes, and thus no backlight source is required, which reduces power consumption. In order to expand the application scope, a front light module is generally disposed above a front panel of the above-mentioned display device, and a light source is disposed on a side surface of a light guide panel (LGP). The light emitted by the light source may travel in the LGP in a total internal reflection manner, and the total internal reflection is destroyed by microstructures, so as to refract the light toward the display and convert the light source into a planar light source with uniform optical distribution. The light refracted toward the display may be then reflected by the display and conveyed to viewers. The purpose of disposing the front light module is to allow the above-mentioned display to provide sufficient incident light even in places with insufficient ambient light for users to watch the display images.

To be specific, since the front light module is disposed above the electronic paper display, and a surface of the electronic paper may scatter the incident light at a large angle, the microstructures of its LGP may be disposed on a surface of the LGP facing the electronic paper display, so as to allow the reflected light to be emitted with a Lambertian intensity distribution. As such, the display images may have favorable full-angle visibility.

However, if the front light module is disposed above the reflective display or a transflective display, since a surface of such a display is similar to a mirror surface, the incident light is mirror-reflected. Accordingly, the reflected light is still emitted at a large tilt angle, and an expansion angle of the emitted light is limited, which may lead to poor performance of images displayed at a positive view angle and reduce the full-angle visibility. In this regard, the general solution is to arrange the microstructures of the LGP on a surface of the LGP facing away from the display, its effective optical angle is set to be greater than 15 degrees, and an air layer is arranged between the front light module and the touch panel above the front light module; namely, the surface of the front light module facing the touch panel is not in direct contact with the touch panel and is spaced from the touch panel by the air layer. Through the configuration of the large effective optical angle, the light is refracted toward the display in a direction closer to a normal direction, and the range of light emitted from the front light module may be expanded when the light enters the air layer through the microstructures, which ensures sufficient view angle for normal reading purposes. However, when the light in the air layer enters the touch panel, the light may be reflected by the surface of the touch panel and then transmitted in the air layer through the surface of the touch panel and the surface of the LGP opposite to each other to form stray light, which further poses a negative impact on the optical performance, the contrast, and the touch sensing experience of the display device.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display device which provides good optical efficiency, contrast, and touch sensing experience.

In order to achieve one or a part or all of the foregoing objectives or other objectives, an embodiment of the invention provides a display device. The display device includes a front light module, a touch panel, and an optical adhesive layer. The front light module includes a light source and a light guide plate (LGP). The light source is configured to provide an illumination beam. The LGP is located on a transmission path of the illumination beam, where the LGP has a first surface and a second surface opposite to each other, and the LGP includes a plurality of microstructures which are recessed into the LGP in a direction from the first surface to the second surface to form a plurality of voids. A maximum vertical distance between each of the plurality of voids and the first surface is a first depth. The first surface faces the touch panel. The optical adhesive layer is adhered between the touch panel and the first surface of the LGP. A surface of the optical adhesive layer facing the LGP has a plurality of first regions and a plurality of second regions, and in the plurality of first regions, the surface of the optical adhesive layer facing the LGP is in contact with the first surface of the LGP, and in the plurality of second regions, the surface of the optical adhesive layer facing the LGP and the plurality of microstructures being overlapped A vertical distance between the plurality of first regions and the plurality of second regions is 0 to 0.7 times the first depth, and a refractive index of the optical adhesive layer is less than a refractive index of the LGP.

In an embodiment of the invention, the vertical distance between the plurality of first regions and the plurality of second regions is 0 to 0.5 times the first depth.

In an embodiment of the invention, the vertical distance between the plurality of first regions and the plurality of second regions is 0, the optical adhesive layer comprises a body, and the body is adhered between the touch panel and the first surface of the LGP.

In an embodiment of the invention, the vertical distance between the plurality of first regions and the plurality of second regions is greater than 0, the optical adhesive layer comprises a body and a plurality of protrusions, the body is adhered between the touch panel and the first surface of the light guide plate, each of the plurality of protrusions is located in each of the plurality of second regions, each of the protrusion is in contact with a light guide optical surface of each of the plurality of microstructures, the light guide optical surfaces of the plurality of microstructures are connected to the first surface, and an included angle between the light guide optical surface of each of the plurality of the microstructures and the first surface is less than 165 degrees.

In an embodiment of the invention, the touch panel and the LGP are directly adhered to each other through the optical adhesive layer.

In an embodiment of the invention, the LGP has a light incidence surface, the illumination beam enters the LGP through the light incidence surface of the LGP, each of the plurality of microstructures has a maximum length in a normal direction of the light incidence surface, each of the plurality of the microstructures has a maximum width in a direction parallel to the light incidence surface and the first surface, and the maximum length is greater than or equal to the maximum width In an embodiment of the invention, the display device further includes a display panel, where the LGP is located between the optical adhesive layer and the display panel.

In an embodiment of the invention, the display device further includes an adhesive bonding layer, where the LGP is attached to the display panel through the adhesive bonding layer.

In an embodiment of the invention, the display panel is a reflective liquid crystal panel.

In an embodiment of the invention, there is a refractive index difference value between the refractive index of the LGP and the refractive index of the optical adhesive layer, and the refractive index difference value ranges from 0.05 and 0.2.

In view of the above, one or more embodiments of the invention have at least one of the following advantages or effects. In the display device provided in one or more embodiments of the invention, the front light module is directly adhered to the touch panel through the optical adhesive layer, and the configuration in which the surface of the optical adhesive layer facing the LGP in the first regions is in contact with the first surface of the LGP effectively prevents light beams from being reflected when the light beams enter the touch panel, so as to avoid stray light. As such, the resultant display device may achieve favorable optical performance, good contrast, and provide good touch sensing experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
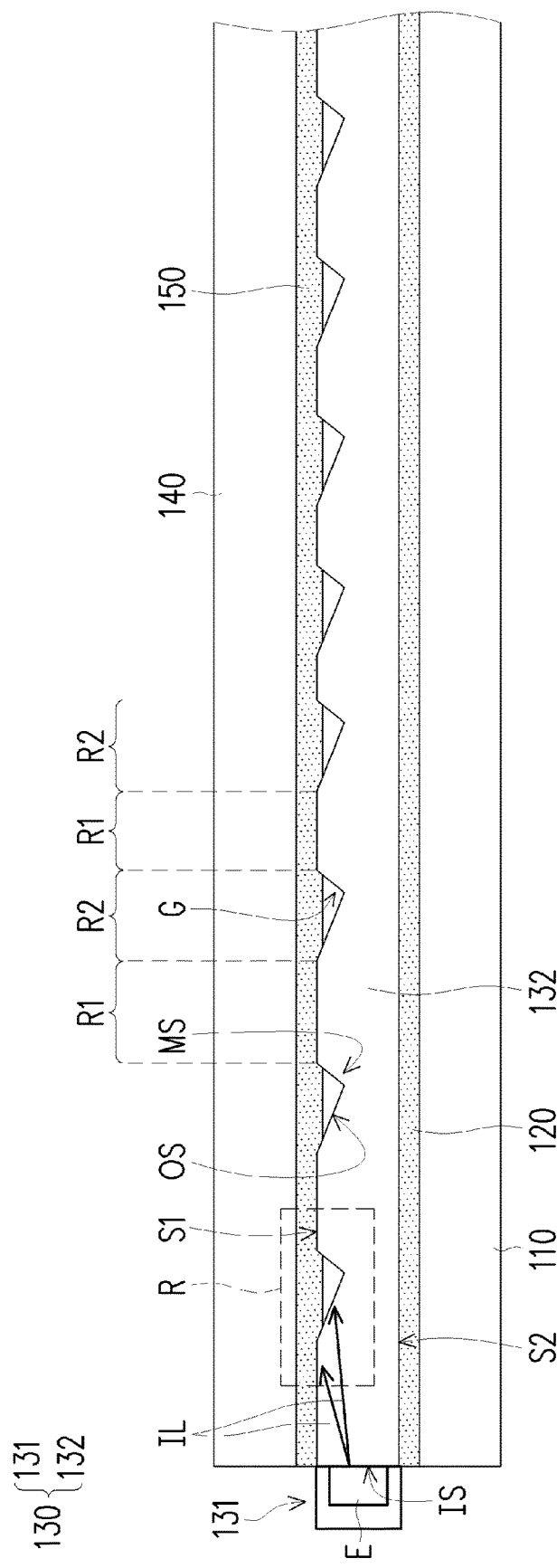
FIG. 1 is a schematic view illustrating a structure of a display device according to an embodiment of the invention.
Figure 2:
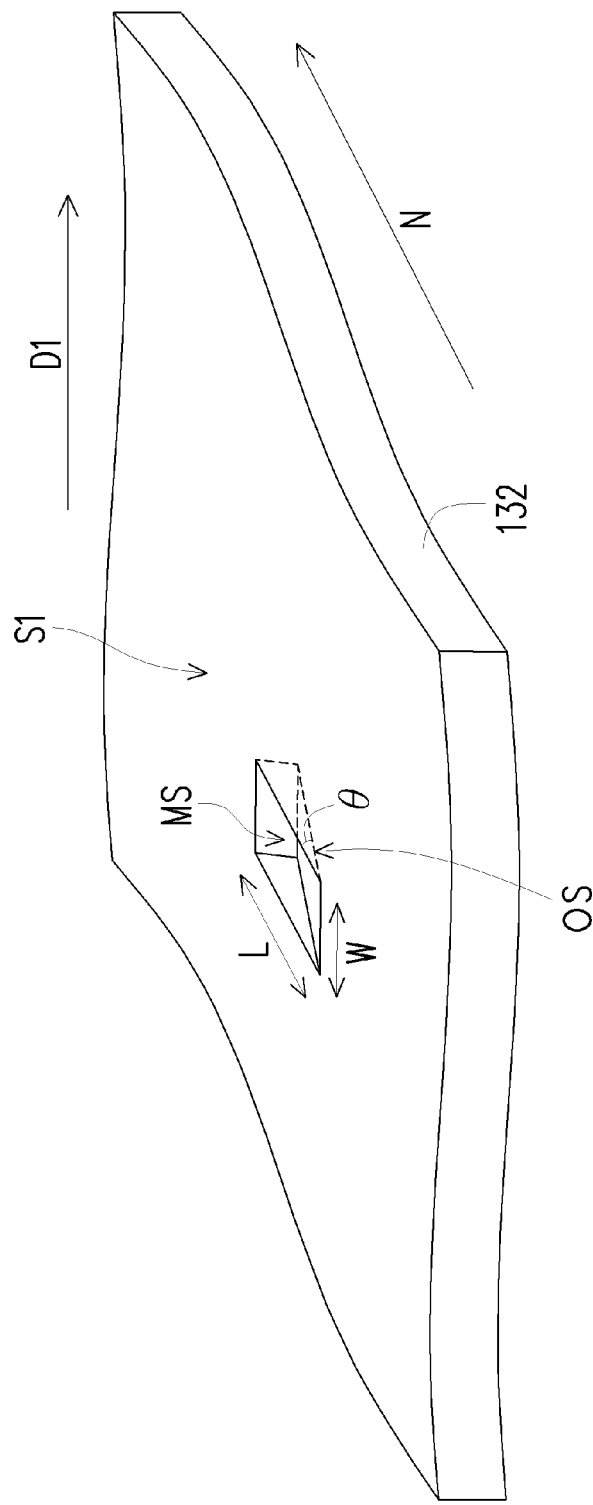
FIG. 2 is a schematic view illustrating one single microstructure in a partial region of the LGP shown in FIG. 1.
Figure 3:
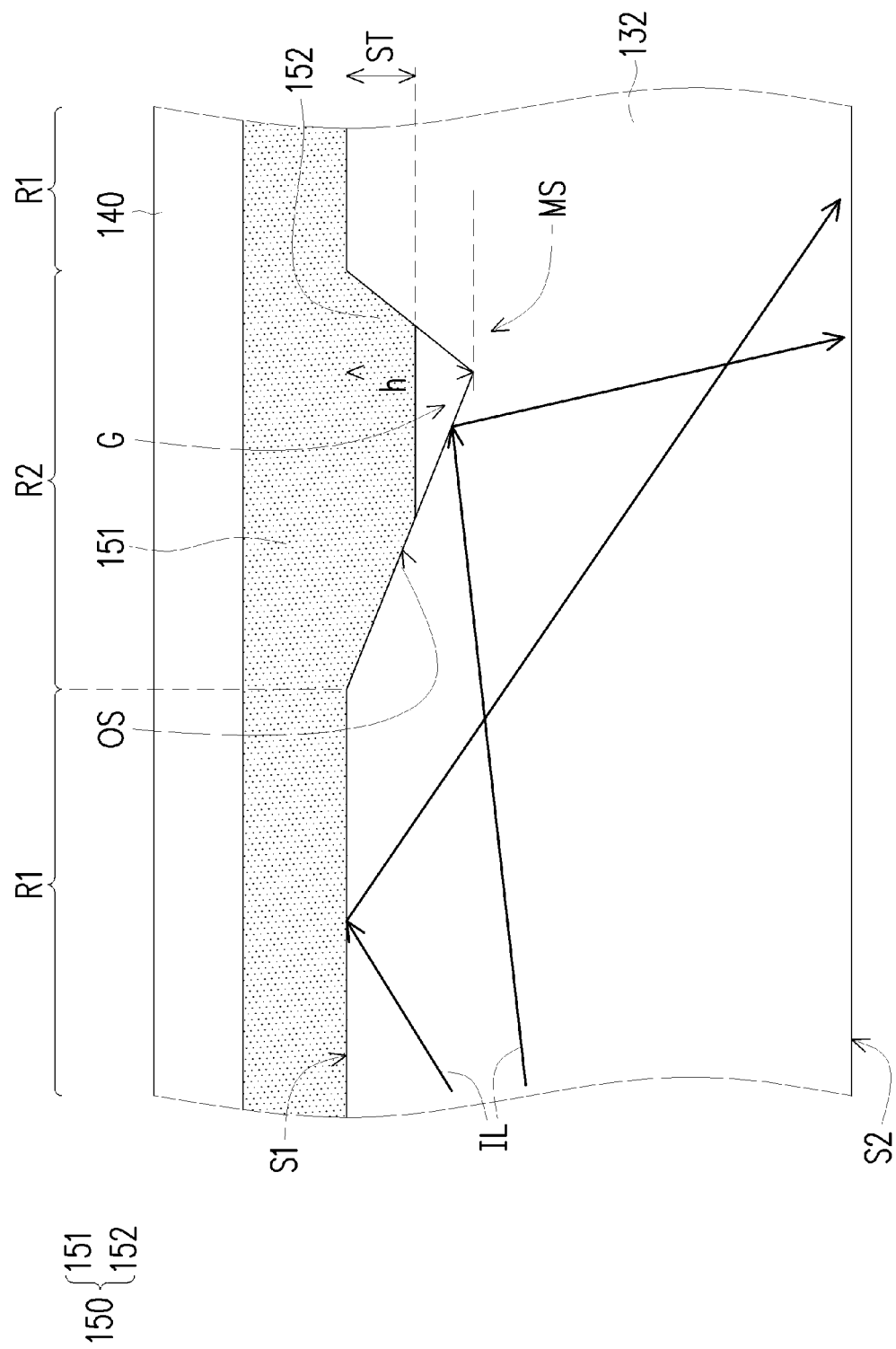
FIG. 3 is a schematic view illustrating a light path in a partial region of the display device shown in FIG. 1.

FIG. 1 is a schematic view illustrating a structure of a display device according to an embodiment of the invention. FIG. 2 is a schematic view illustrating one single microstructure in a partial region of the LGP shown in FIG. 1. FIG. 3 is a schematic view illustrating a light path in a partial region R of the display device shown in FIG. 1. With reference to FIG. 1, a display device 100 includes a display panel 110, an adhesive bonding layer 120, a front light module 130, a touch panel 140, and an optical adhesive layer 150. For instance, in this embodiment, the display panel 110 is a reflective liquid crystal display panel or a transflective liquid crystal display panel.

Specifically, as shown in FIG. 1, the front light module 130 includes a light source 131 and an LGP 132. The light source 131 is configured to provide an illumination beam IL. For instance, in this embodiment, the light source 131 may include a plurality of light emitting elements E, and the light emitting elements E may include light emitting diode (LED), mini light emitting diode (mini LED), micro light emitting diode (micro LED), or the like. As shown in FIG. 1, in this embodiment, the LGP 132 is located between the optical adhesive layer 150 and the display panel 110, and the adhesive bonding layer 120 is located between the LGP 132 and the display panel 110, where the LGP 132 is attached to the display panel 110 through the adhesive bonding layer 120 and directly adhered to the touch panel 140 through the optical adhesive layer 150.

More specifically, as shown in FIG. 1, in the present embodiment, the LGP 132 has a first surface S1 and a second surface S2 opposite to each other and a light incidence surface IS connecting the first surface S1 and the second surface S2. Besides, as shown in FIG. 1 and FIG. 2, the LGP 132 includes a plurality of microstructures MS; as shown in FIG. 2, each of the microstructures MS has a maximum length L in a normal direction N of the light incidence surface IS and has a maximum width W in a direction D1 parallel to the light incidence surface IS and the first surface S1, and the maximum length L is greater than or equal to the maximum width W. As shown in FIG. 1 and FIG. 2, each of the microstructures MS has a light guide optical surface OS connected to the first surface S1, and an included angle θ between the light guide optical surfaces OS of the microstructures MS and the first surface S1 is, for instance, less than 165 degrees and greater than 90 degrees.

In another aspect, as shown in FIG. 1 and FIG. 3, the microstructures MS are recessed in a direction from the first surface S1 to the second surface S2 to form a plurality of voids G, and as shown in FIG. 3, a maximum vertical distance between the voids G and the first surface S1 is a first depth h. Additionally, as shown in FIG. 1, in the present embodiment, the first surface S1 of the LGP 132 faces the touch panel 140, and the optical adhesive layer 150 is adhered between the touch panel 140 and the first surface S1 of the LGP 132 and overlapped with the microstructures MS.

More specifically, as shown in FIG. 1 and FIG. 3, the optical adhesive layer 150 has a body 151 and a plurality of protrusions 152 extending from a surface of the body 151 facing the LGP. Here, when the optical adhesive layer 150 is adhered to the touch panel 140 and the first surface S1 of the LGP 132, the body 151 of the optical adhesive layer 150 is adhered to the touch panel 140 and the first surface S1 of the LGP 132, and the protrusions 152 are further extended into the voids G to contact the light guide optical surfaces OS of the microstructures MS.

In particular, as shown in FIG. 1 and FIG. 3, the surface of the optical adhesive layer 150 facing the LGP 132 has a plurality of first regions R1 and a plurality of second regions R2, where the second regions respectively correspond to the protrusions 152, and the first regions respectively correspond to parts of the body 151 other than the protrusions 152. The surface of the optical adhesive layer 150 facing the LGP 132 (i.e., the surface of the body 151 of the optical adhesive layer 150 in the first regions R1) in the first regions R1 is in contact with the first surface S1 of the LGP 132. The surface of the optical adhesive layer 150 facing the LGP 132 (i.e., the surfaces of the protrusions 152 of the optical adhesive layer 150) in the second regions R2 overlaps the microstructures MS and protrudes into the voids G, and is in contact with the light guide optical surfaces OS of the microstructures MS.

Thereby, as shown in FIG. 1 and FIG. 3, since the LGP 132 is located on a transmission path of the illumination beam IL, when the illumination beam IL emitted by the light source 131 enters the LGP 132 through the light incidence surface IS of the LGP 132 and travels in a total internal reflection manner, the total internal reflection may be destroyed by the microstructures MS, so as to refract the illumination beam IL toward the display panel 110. In addition, as shown in FIG. 3, since the effective optical angle of the microstructures MS is greater than 15 degrees, the illumination beam IL is refracted toward the display panel 110 through the microstructures MS in a direction close to the normal direction N. As such, the image beam reflected by the display panel and transmitted to a viewer may achieve good performance in a direction of a positive view angle. In another aspect, due to the configuration of the voids G, the image beam reflected by the display panel 110 and transmitted to the viewer may be scattered after the image beam enters the voids G through the microstructures MS, and the range of the image beam emitted from the front light module 130 may be expanded, so as to ensure sufficient view angle for normal reading purposes. Moreover, since the surface of the optical adhesive layer 150 facing the LGP 132 in the first regions R1 is in contact with the first surface S1 of the LGP 132, less stray light may be generated. Therefore, through the structural arrangement of the optical adhesive layer 150, the microstructures MS, and the voids G, the positive view angle of the display images and the full-angle visibility may be improved, and the possibility of generating the stray light due to the reflection of light when the light enters the touch panel 140 may be effectively reduced. As such, the display device 100 may have good optical performance and contrast and provide favorable touch sensing experience.

More specifically, the larger the maximum depth of the protrusions 152 extending into the voids G (i.e., the larger a step difference ST between the second regions R2 and the first regions R1 of the surface of the optical adhesive layer 150 facing the LGP 132, the step difference ST can be regarded as the vertical distance between the first regions R1 and the second regions R2, and the vertical distance between the first regions R1 and the second regions R2 is 0 to 0.7 times the first depth h) is, the smaller the voids G are, and the less possible the stray light is generated by reflecting the light in the voids G when the light enters the touch panel 140, which is conducive to the improvement of the optical performance, the contrast, and the touch sensing experience of the display device 100.

However, from another perspective, given that the distribution density of the microstructures MS is of a fixed value, the larger the step difference ST (i.e., the maximum depth of the protrusions 152 extending into the voids G, the step difference ST can be regarded as the vertical distance between the first regions R1 and the second regions R2) is, the smaller the effective area of the light guide optical surfaces OS of the microstructures MS is, which may pose a negative impact on the light emitting ability and further affect the optical performance. Hence, when the step difference ST is excessively large, the distribution density of the microstructures MS may be further increased for compensation, so as to simultaneously reduce the stray light and maintain good optical performance.

In another aspect, according to the present embodiment, a refractive index of the optical adhesive layer 150 is less than a refractive index of the LGP 132; besides, the greater a refractive index difference between the refractive index of the LGP 132 and the refractive index of the optical adhesive layer 150 is, the higher the light reflectivity of an interface between the optical adhesive layer 150 and the LGP 132 is, whereby the optical performance may be improved. For instance, when the refractive index of the LGP 132 is 1.57, the refractive index of the optical adhesive layer 150 may range from 1.4 to 1.525; however, when the refractive index of the optical adhesive layer 150 is greater than 1.47, there may be significant changes to the loss of optical performance, and when the refractive index of the optical adhesive layer 150 is greater than 1.52, the optical performance is reduced by about 10%. Hence, in the present embodiment, the refractive index difference between the refractive index of the LGP 132 and the refractive index of the optical adhesive layer 150 is preferably greater than 0.05 and less than 0.2.

Although the optical adhesive layer 150 has a plurality of protrusions 152 as shown in FIG. 1 and FIG. 3, note that this should not be construed as a limitation to the invention; in other embodiments, the optical adhesive layer 150 may not have any protrusion 152. Further explanation will be given below with reference to FIG. 4.

Figure 4:
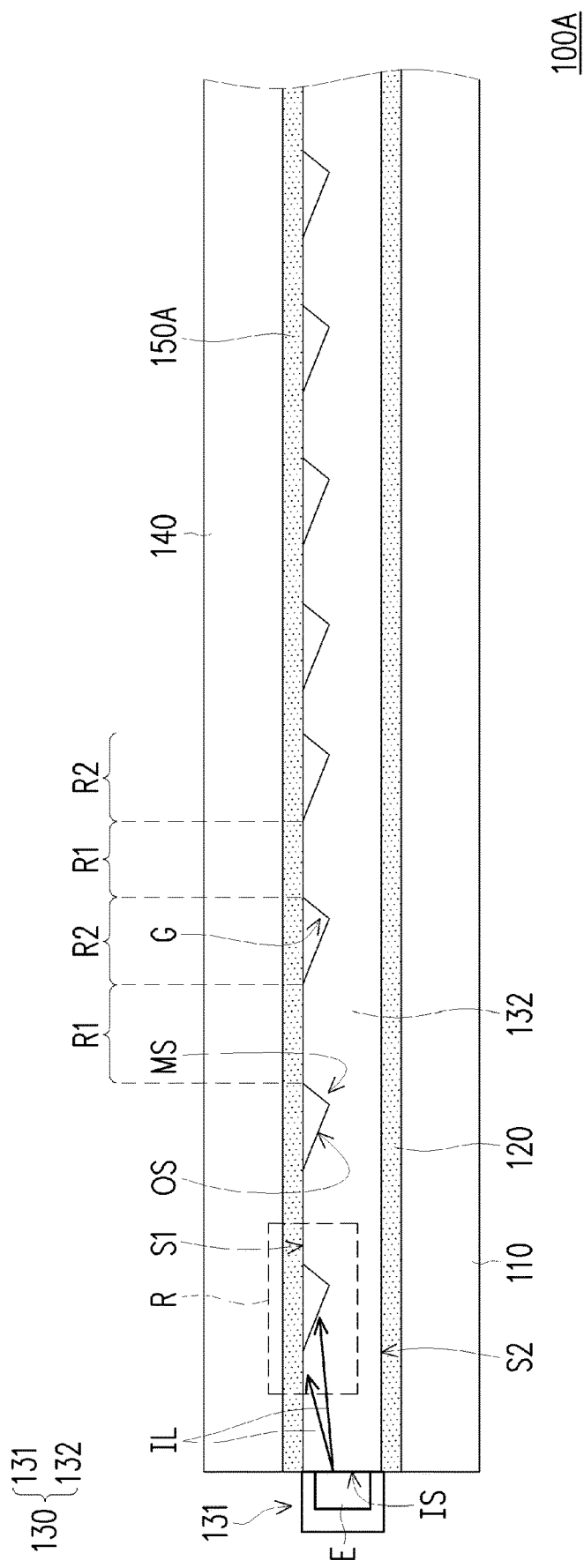
FIG. 4 is a schematic view illustrating a structure of a display device according to another embodiment of the invention.

FIG. 4 is a schematic view illustrating a structure of a display device according to another embodiment of the invention. With reference to FIG. 4, a display device 100A depicted in FIG. 4 is similar to the display device 100 depicted in FIG. 1, while the differences therebetween are described below. As shown in FIG. 4, in the present embodiment, an optical adhesive layer 150A may have the body 151 as shown in FIG. 3 but may not have the protrusions 152 as shown in FIG. 3; that is, there is no step difference ST between the first regions R1 and the second regions R2 of a surface of the optical adhesive layer 150A facing the LGP 132, and the surface of the optical adhesive layer 150A facing the LGP 132 is a flat plane, in other words, the vertical distance between the first regions R1 and the second regions R2 is equal to 0. However, in the present embodiment, the surface of the optical adhesive layer 150A facing the LGP 132 in the first regions R1 is in contact with the first surface S1 of the LGP 132, and therefore less stray light may be generated, whereby the display device 100A may achieve functions similar to those achieved by the above-mentioned display device 100, and similar reflection effects and advantages may be achieved by the display device 100A and the display device 100, which will not be further explained hereinafter.

To sum up, one or more embodiments of the invention have at least one of the following advantages or effects. In the display device provided in one or more embodiments of the invention, the front light module is directly adhered to the touch panel through the optical adhesive layer, and the configuration in which the surface of the optical adhesive layer facing the LGP in the first regions is in contact with the first surface of the LGP effectively prevents light beams from being reflected when the light beams enter the touch panel, so as to avoid stray light. As such, the resultant display device may achieve favorable optical performance, good contrast, and provide good touch sensing experience.

The foregoing description of the preferred of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
   a front light module, comprising:
   a light source, configured to provide an illumination beam; and
   a light guide panel, located on a transmission path of the illumination beam, wherein the light guide panel has a first surface and a second surface opposite to each other, the light guide panel comprises a plurality of microstructures, the plurality of microstructures are recessed into the light guide plate in a direction from the first surface to the second surface to form a plurality of voids, and a maximum vertical distance between each of the plurality of voids and the first surface is a first depth;
   a touch panel, wherein the first surface faces the touch panel; and
   an optical adhesive layer, adhered between the touch panel and the first surface of the light guide panel, wherein a surface of the optical adhesive layer facing the light guide panel has a plurality of first regions and a plurality of second regions, wherein in the plurality of first regions, the surface of the optical adhesive layer facing the light guide panel is in contact with the first surface of the light guide panel, wherein in the plurality of second regions, the surface of the optical adhesive layer facing the light guide panel and the plurality of microstructures being overlapped, a ratio of a vertical distance between the plurality of first regions and the plurality of second regions to the first depth is 0 to 0.7, and a refractive index of the optical adhesive layer is less than a refractive index of the light guide panel.

2. The display device according to claim 1, wherein the vertical distance between the plurality of first regions and the plurality of second regions is 0 to 0.5 times the first depth.

3. The display device according to claim 1, wherein the vertical distance between the plurality of first regions and the plurality of second regions is 0, the optical adhesive layer comprises a body, and the body is adhered between the touch panel and the first surface of the light guide plate.

4. The display device according to claim 1, wherein the vertical distance between the plurality of first regions and the plurality of second regions is greater than 0, the optical adhesive layer comprises a body and a plurality of protrusions, the body is adhered between the touch panel and the first surface of the light guide plate, each of the plurality of protrusions is located in each of the plurality of second regions, each of the protrusion is in contact with a light guide optical surface of each of the plurality of the microstructures, the light guide optical surfaces of the plurality of microstructures are connected to the first surface, and an included angle between the light guide optical surface of each of the plurality of the microstructures and the first surface is less than 165 degrees.

5. The display device according to claim 1, wherein the touch panel and the light guide panel are directly adhered through the optical adhesive layer.

6. The display device according to claim 1, wherein the light guide panel has a light incidence surface, the illumination beam enters the light guide panel through the light incidence surface of the light guide panel, each of the plurality of the microstructures has a maximum length in a normal direction of the light incidence surface, each of the plurality of microstructures has a maximum width in a direction parallel to the light incidence surface and the first surface, and the maximum length is greater than or equal to the maximum width.

7. The display device according to claim 1, further comprising a display panel, wherein the light guide panel is located between the optical adhesive layer and the display panel.

8. The display device according to claim 7, further comprising an adhesive bonding layer, wherein the light guide panel is attached to the display panel through the adhesive bonding layer.

9. The display device according to claim 7, wherein the display panel is a reflective liquid crystal panel.

10. The display device according to claim 1, wherein a refractive index difference value exists between the refractive index of the light guide panel and the refractive index of the optical adhesive layer, and the refractive index difference value ranges from 0.05 and 0.2.

* * * * *